United States Patent [19]

Rodloff et al.

[11] Patent Number: 4,628,515
[45] Date of Patent: Dec. 9, 1986

[54] RING LASER, ESPECIALLY FOR A RING LASER TYPE OF GYRO

[75] Inventors: Rüdiger K. Rodloff, Meinersen; Werner W. Jungbluth, Königslutter, both of Fed. Rep. of Germany

[73] Assignee: Deutsche Forschungs- und Versuchsanstalt fur Luft- und Raumfahrt e.V., Cologne, Fed. Rep. of Germany

[21] Appl. No.: 716,322

[22] Filed: Mar. 26, 1985

[30] Foreign Application Priority Data

Mar. 31, 1984 [DE] Fed. Rep. of Germany ....... 3412017

[51] Int. Cl.⁴ ................................................ H01S 3/08
[52] U.S. Cl. ...................................... 372/107; 372/94; 372/99; 372/29; 356/350
[58] Field of Search .................... 372/94, 92, 93, 99, 372/107, 29; 356/350

[56] References Cited

U.S. PATENT DOCUMENTS 4,152,072 5/1979 Hutchings ....................... 356/350
4,397,027 8/1983 Zampiello ........................ 372/94
4,556,319 12/1985 Gauert et al. .................... 372/94

Primary Examiner—Leon Scott, Jr.
Attorney, Agent, or Firm—Salter & Michaelson

[57] ABSTRACT

A ring laser, especially for a ring laser type of gyro, comprising a block produced from a thermally and mechanically highly-stable ceramic glass and three corner mirrors. At least one of the mirrors can be tilted about an axis by a servo-drive and one of the mirrors is a semi-transparent separating mirror, behind which is arranged a photo-detector in the beam path of the separated beam portion of one of the rotating wave trains. The photo-detector may at least be one photo-diode which is arranged in such a way that it gives an output signal proportional to the position of the beam, as a function of which an adjustment signal is formed for the servo-drive of the tiltable mirror. Two photo-diodes can be provided alongside or on top of each other in the plane of the beam. The photo-diodes are in the form of a differential photo-diode. In order to eliminate errors, one of the corner mirrors is tiltable about an axis perpendicular to the plane of the beam path.

10 Claims, 15 Drawing Figures

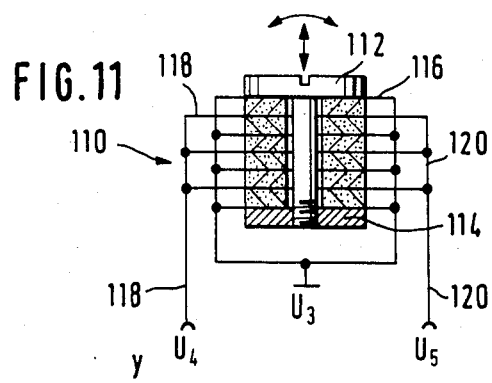
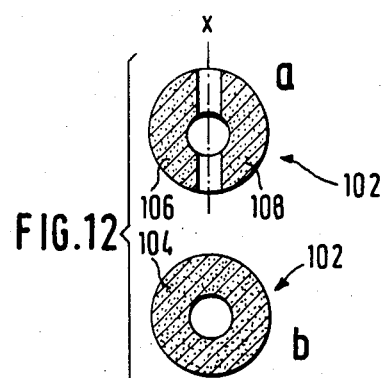
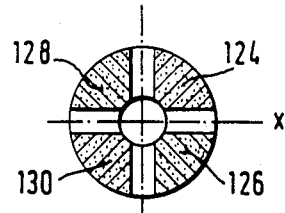
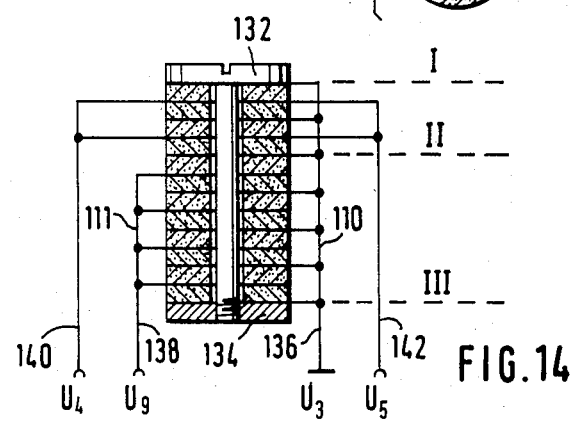
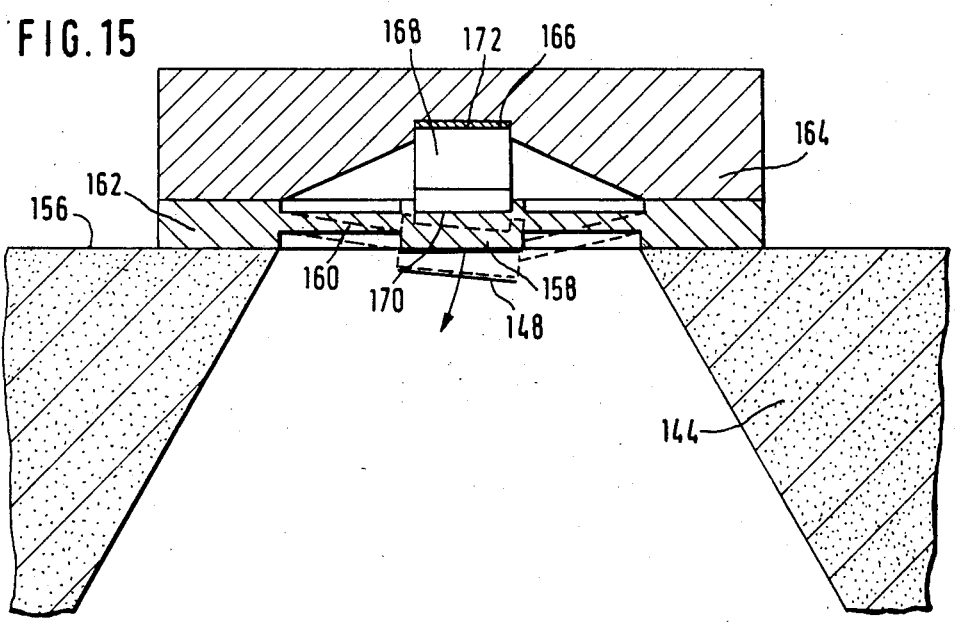

RING LASER, ESPECIALLY FOR A RING LASER TYPE OF GYRO

FIELD OF THE INVENTION

The invention relates to a ring laser of the kind (hereinafter called the kind specified) comprising a block produced from a thermally and mechanically highly-stable ceramic glass and having three corner mirrors of which at least one can be tilted about an axis by a servo-drive, and one is a semi-transparent separating mirror, behind which is a photo-detector arranged in the beam path of the separated beam portion of one of the rotating wave trains, and a control by which an adjustment signal is transmitted to the servo-drive for the tiltable mirror, as a function of an output signal from the photo-detector. The positioning in a ring laser of the corner mirrors through which the rotating wave trains of the beam are deviated represent a particular problem. The corner mirrors must be aligned to each other with a degree of accuracy of fractions of one second of arc so as to ensure that the path of the beam traverse exactly the axis of the amplifier medium. In ring lasers the mirror stop faces on the central resonator block must therefore be produced with a high degree of precision. In spite of this, certain residual aberrations will prove unavoidable with regard to the mirror alignment. A further source of error lies in alterations in the geometry of the ring laser in operation, whether through temperature changes or through mechnical influences.

DESCRIPTION OF THE PRIOR ART

To compensate misalignment of the beam in the plane of the beam, in the case of a known ring laser of the kind specified, one of the corner mirrors is tiltable about its axis extending perpendicular to the plane of the beam. The signal given by the photo-detector is modulated according to the faulty positioning of the rotating beam. Using special reference signals an adjustment signal for the servo-drive of the tiltable mirror is determined from the signal and is transmitted to the servo-drive. This control is set for the maintenance of a maximum intensity. The corresponding curve has a very low gradient in the region of the maximum, which means that errors in the positioning of the mirrors can only be compensated inside a working range determined by the control unit. Control is moreover associated with considerable expense (U.S. Pat. No. 4,113,387).

A further known arrangement involves compensation of and/or prevention of faulty mirror positioning, occasioned above all thermally and as a result of production technology, by bending the whole resonator block. The problem with this method is that it is not only the mirrors which are angularly displaced but also the gas discharge capillary tubes inside the block are bent, with the result that the influence of the plasma flow on the light wave trains is altered and additional drift effects are produced. In the case of this known ring laser, the output power of the ring laser is measured as a characteristic measurement value and in a load side loop, the regulated conditions are determined for piezo bending elements by which the resonator block is bent. In this case, the disadvantage, together with the problems of geometry, is that the loop is relatively expensive. The output power must therefore be differentiated in order to obtain information, relating to the sign of the regulated conditions. Here too the control unit again only finds a relative maximum for the output power (DE-OS No. 31 43 798).

Another known arrangement in the case of a speed of rotation sensor provides photo-detectors with which the intensity of the separated beam portions of both counterrotating wave trains is measured. The signals are fed to an adder. The sum signal is then fed via a high voltage amplifier, from which the output is used as an adjustment signal for a servo-drive of one of the corner mirrors whereby a translational movement is effected to keep the length of the resonator cavity constant (DE-OS No. 30 09 796).

The object of the invention is to design a ring laser of the kind specified in such a way that an extensive optimisation of the resonator geometry can be achieved by relatively simple means and this in the case of faulty mirror positioning occasioned either thermally or as a result of production technology.

SUMMARY OF THE INVENTION

This problem is solved according to the invention in that the photo-detector comprises at least one photo-diode arranged in such a way that it provides an output signal proportional to the position of the beam, as a function of which an adjustment signal is formed for the servo-drive of the tiltable mirror.

The photo-detector may comprise two photo-diodes positioned alongside one another in the beam plane each photo-diode providing an output signal dependant on the position of the beam portion it receives, the ring laser also includes a subtractor by which the output signals from the two photo-diodes are subtracted and which provides an adjustment signal which is proportional to the differential signal produced in the subtractor for the servo-drive of the tiltable mirror.

The two photo-diodes may be incorporated in a differential photo-diode of which the centre point lies in the beam path of the separated beam portion in the case of optimised beam rotation in the ring laser.

The tiltable mirror may be tiltable about a vertical axis perpendicular to the plane of the beam path or a horizontal axis lying in the plane of the beam path and may be displaceable parallel to itself. The differential photo-diode may be a four quadrant differential diode.

The servo-drive may be of the kind comprising a plurality of piezo disks arranged in a column, the disks being polarised in such a way that the direction of extension of said column and the direction of electrical field are parallel, at least one of said piezo disks having a contact surface thereon divided symmetrically into a plurality of electrically seperate contact segments and said servo-drive also including a plurality of separate electrical connections each provided on a respective one of said contact segments of said contact surface on said at least one piezo disk. The contact surface on the piezo disk may have four symmetrical contact segments. The piezo disks in the column may be arranged under initial compression between a support and the back of the mirror to be adjusted in such a way that the contact segments are symmetrical about the axis of tilt of the mirror.

BRIEF DESCRIPTION

The invention is ill strated by way of example in the drawing and is subsequently described in detail with the aid of the drawing in which.

Figure 2:
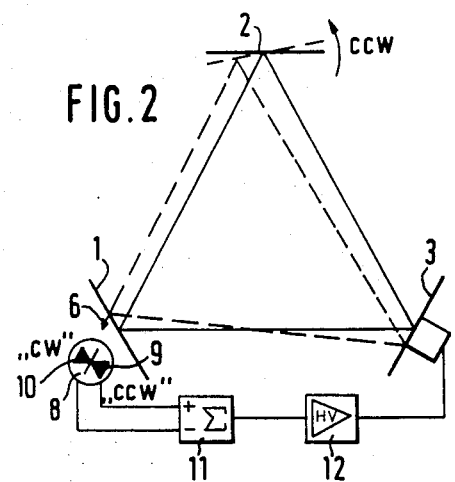
FIG. 2 shows the effect of tilting one of the mirrors about an axis lying perpendicular to the plane of the beam.
Figure 3:
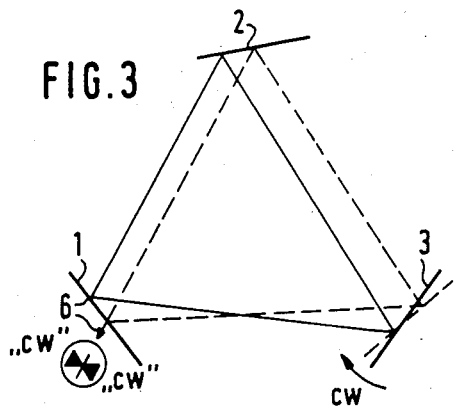
FIG. 3 shows the compensation of the mirror tilting by adjustment of the further mirror provided with a tilting drive effective about the same axis.
Figure 4:
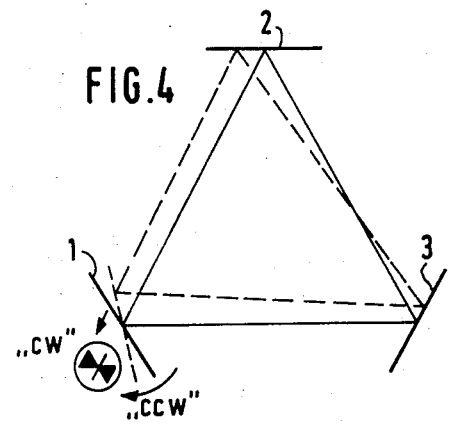
Figure 5:
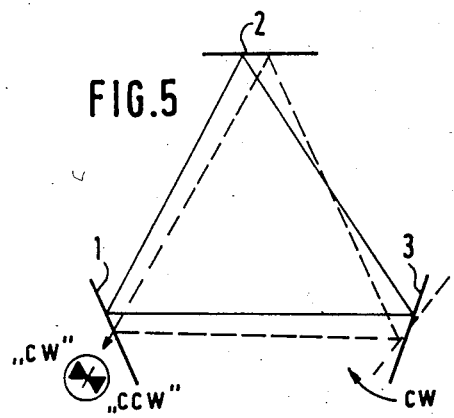

FIG. 4/5 show respectively the situations corresponding to FIG. 2 and 3 in the case of the tilting of the mirror by which the beam portion is separated.

Figure 6:
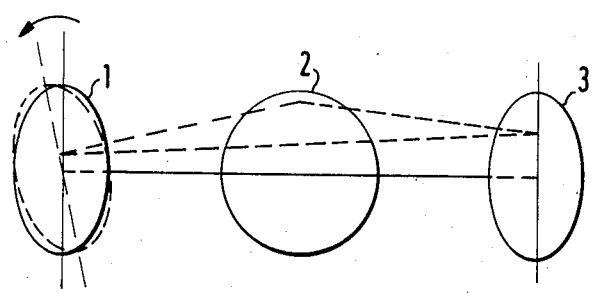

FIG. 6 shows the appearance of a pyramidal error produced by tilting one of the corner mirrors about an axis of tilting lying in the plane of the beam.

Figure 7:
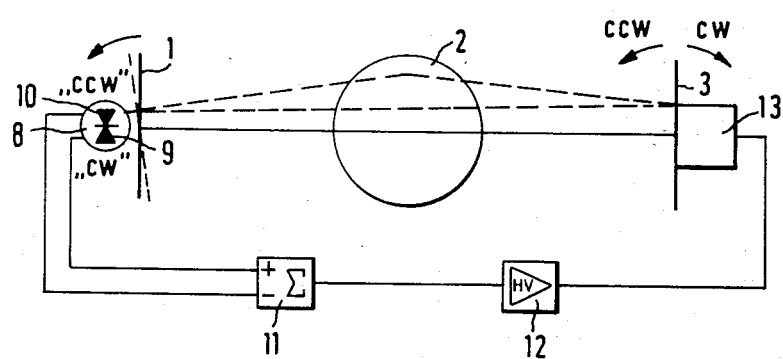

FIG. 7 shows an arrangement and control for compensation of a pyramidal error with a beam plane displaced by the pyramidal error.

Figure 8:
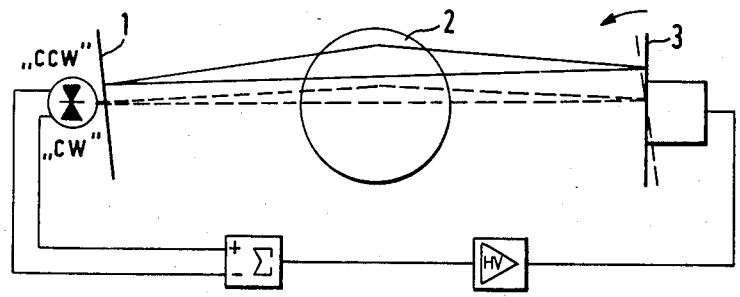

FIG. 8 shows the compensation of the pyramidal error according to FIG. 7.

Figure 9:
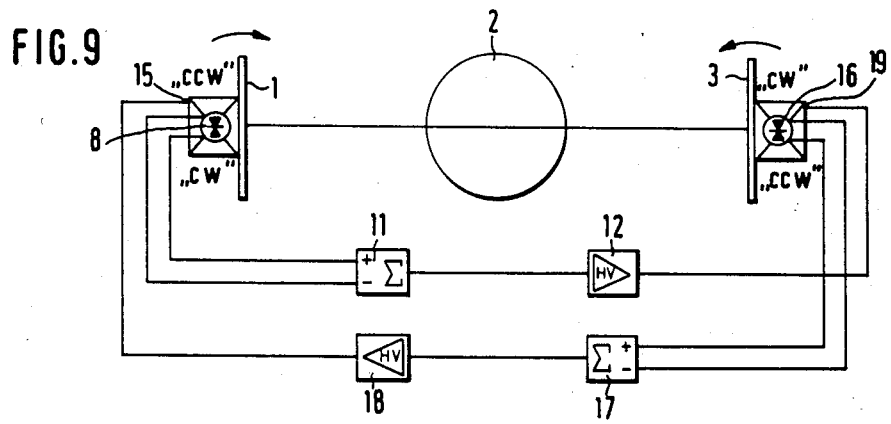

FIG. 9 shows an arrangement and control for the complete compensation of pyramidal errors.

Figure 10:
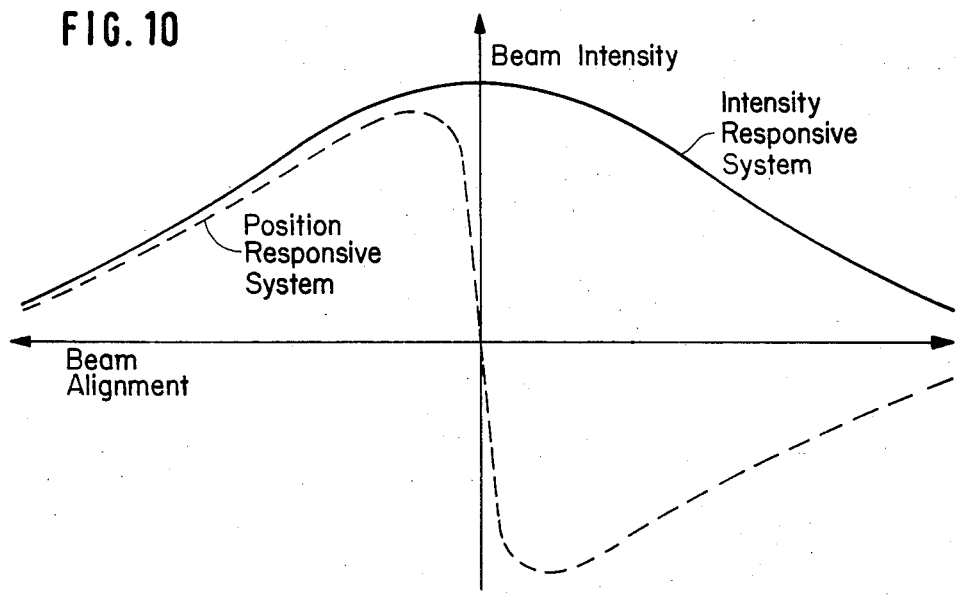

FIG. 10 shows a curve with the differential signal determined according to the invention and with beam intensity plotted against pyramidal angle.

FIG. 11 shows a servo-drive by which a tilting movement can be imparted to a mirror.

FIG. 12 shows in plan view the two sides of a piezo disk such as is used in the case of a servo-drive according to FIG. 11. to effect a tilting movement about an axis.

FIG. 13 shows in plan view a further embodiment of a piezo disk for a servo-drive with two axes of tilting.

FIG. 14 shows a further embodiment of a servo-drive.

FIG. 15 shows an embodiment of a corner mirror of a ring laser with a servo-drive according to FIG. 11 or 14.

DESCRIPTION OF THE PREFERRED EMBODIMENTS

Figure 1:
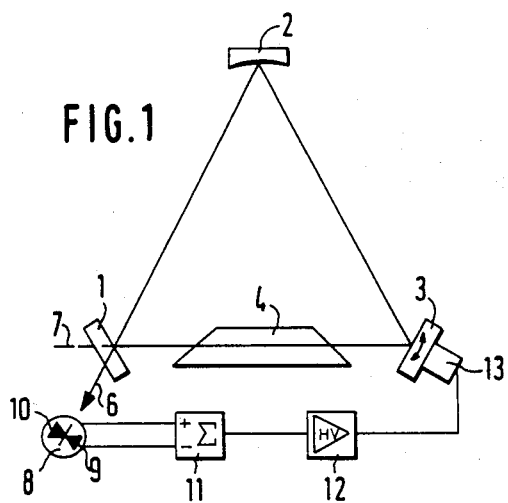
FIG. 1 shows in plan view the principle of the design and the arrangement of a ring laser designed according to the invention.

FIG. 1. illustrates the principle of a ring laser having three corner mirrors 1, 2 and 3, of which one is a concave mirror and having an optical amplifier medium or laser medium 4. In the case of the ring lasers for application in a laser type of gyro, this is generally provided by He-Ne gas discharge. Within the triangle as defined by the mirrors, two light wave trains rotate in opposite directions and from which beam portions 6 and 7 are separated at one of the mirrors—in this case mirror 1 which is a semi-transparent mirror. In the path of the separated beam portion 6 there is a differential photo-diode 8 having two photo-diodes 9 and 10. The photo-diode 8 is arranged in such a way that given optimal adjustment of all the components, the light beam 6 strikes at the exact centre of the zero position of the differential photo-diode. The two photo-diodes 9 and 10 are connected to a subtractor 11, of which the output signal is transmitted to a high voltage amplifier 12. From this, servo-drive 13 can be reached. The servo-drive 13 is operated to tilt the mirror 3 about its axis extending perpendicular to the plane of the beam.

In the case of the described arrangement, optimal adjustment of every component means that similar output signals are produced by both photo-diodes 9 and 10. The output signal of the subtractor 11 is then zero and the servo-drive 13 at rest.

Should the mirror be tilted in the counter-clockwise direction into the position shown by the broken lines in FIG. 2. then the beam is displaced into position also shown by broken lines. The position of the separated beam portion 6 is therefore also displaced, with the result that this is only admitted to the photo-diode 10 of the differential photo-diode 8. A signal is therefore produced from this photo-diode which is here defined as a signal with a negative sign. As the positive signal from the photo-diode 9 is equal to zero a signal in proportion to the output signal from the photo-diode 10 is given by the subtractor to the high voltage amplifier with negative sign, from which a corresponding adjustment signal is applied to the servo-drive of the mirror 3. The mirror 3 is therefore tilted into the position shown by the broken lines in FIG. 3 until the beam path produced by the tilting of the mirror 2, which is shown by the unbroken line in FIG. 3 is restored to its initial position, which is shown by the broken lines in FIG. 3. In this position, the separated beam portion 6 again strikes the differential photo-diode 8 at its centre, with the result that the output signal becomes zero. The arrangement which has been described works very simply. A direct control of the servo-drive 13 via the differential photo-diodes occurs as a function of the respective position of the beam, i.e. of the position of the separated beam portion 6 relative to the differential photo-diode 8. This photo-diode can, by way of example, be arranged on the back of the mirror 1 at a given distance from the mirror upper surface.

FIG. 4 illustrates a situation whereby the mirror 1 is tilted in a counter-clockwise direction about its axis extending perpendicular to the plane of the beam into the position shown by the broken lines. This tilting movement is indicated by the arrow above "ccw". The beam then occupies the position shown by the broken lines. The photo-diode 10 of the differential photo-diode 8 again receives an input. An adjustment signal is produced in the same way as described previously with reference to FIGS. 2 and 3, by means of which the mirror 3 provided with the servo-drive is tilted in a clockwise direction and therefore, the original position of the beam path—here shown once more by the unbroken lines—is approximately re-established.

The simple method for horizontal beam stabilisation described previously with reference to FIGS. 2 to 5 does not allow a total correction of the beam path. This correction is, however, generally adequate, provided that the beam displacement by thermal and/or mechanical deformation of the block is not too great.

In this connection it should be pointed out that the diagrams in FIGS. 2 to 5 are not scale drawings. The figures merely indicate the trend with regard to beam displacement and its compensation.

The effect is explained by the following embodiments where the basis is a resonator cavity length of 30 cm in the form of an equilateral triangle. The respective horizontal beam misalignment is given resulting from tilting the mirror 1 by 1″ (sec of arc) about the vertical axis extending perpendicular to the plane of the beam:

EXAMPLE 1

Radius of curvature of the concave mirror 2 : 1 m
beam misalignment
 for mirror 1: 0.85 $\mu$m
 for mirror 2: 0.33 $\mu$m
 for mirror 3: 0.26 $\mu$m

EXAMPLE 2

Radius of curvature of the concave mirror: 5 m
beam misalignment
  for mirror 1: 0.84 μm
  for mirror 2: 0.28 μm
  for mirror 3: 0.27 μm In practical operation, tilting of the mirrors about the horizontal axis of tilting in the plane of the beam represents very much more of a problem. The pyramidal error which occurs leads to considerably greater displacements of the beam path in the vertical direction, as is illustrated in the following examples. The length of the resonator cavity is again equal to 30 cm and is in the form of an equilateral triangle. Tilting of mirror 1 by 1" about the horizontal tilting axis occurs.

EXAMPLE 3

Radius of curvature of the concave mirror: 1 m vertical
  beam misalignment
  for mirror 1: 4.36 μm
  for mirror 2: 4.84 μm
  for mirror 3: 4.6 μm

EXAMPLE 4

Radius of curvature of the concave mirror: 5 m
vertical beam misalignment
  for mirror 1: 23.74 μm
  for mirror 2: 24.24 μm
  for mirror 3: 23.99 μm It can be seen from these examples that the influence of resonator cavity deformation on the beam path in the ring laser is of very much more importance in the vertical direction than in the horizontal direction.

A vertical beam misalignment of the aforementioned order of magnitude affects the laser type of gyro in an important way. Vertical displacement of the beam in the laser medium leads to a reduced amplification, and therefore, to an increased loss and moreover, alters the influence of the plasma flow. This results in a change in drift of a laser type of gyro.

FIG. 6 illustrates a front view of the normal beam plane with the three corner mirrors 1, 2 and 3, and shows the beam misalignment which occurs if the mirror 1 is tilted about the horizontal axis. It reveals how the plane of the beam, which is shown in its original position by the unbroken lines, is essentially subject to parallel displacement upwards or, in the case of the opposite tilting of the mirror, downwards.

FIG. 7 illustrates an arrangement whereby the displacement of the plane of the beam can be compensated. The position of the mirrors and of the plane of the beam given the optimal alignment of the mirrors is again shown here by the unbroken lines. Tilting of the mirror 1 about its horizontal axis in the direction of the arrow into the position shown by the broken lines results in the displacement of the plane of the beam into that position also shown by the broken lines. The portion of the beam separated by the mirror 1, which strikes the differential photo-diode 8 in its centre in the undisturbed position, is displaced upwards and strikes the photo-diode 10. From this photo-diode, a signal is passed to the subtractor 11, this signal being dependent on the position of the separated beam portion, and therefore, on the positioning of the disturbed beam plane. From the subtractor 11, a corresponding signal is transmitted to the high voltage amplifier 12, from which the servo-drive 13' receives its adjustment signal, whereby the mirror 3 is tilted about the horizontal axis in the direction of the arrow "ccw". The plane of the beam is thereby displaced back from the position shown by the unbroken lines in FIG. 8 more or less to its original plane, although, as is shown in FIG. 8, a complete restoration to the original position is not yet achieved.

Compensation of the vertical beam misalignment by the automatically controlled mirror 3 about the horizontal axis results in the following non-compensatable vertical beam misalignment.
  for mirror 1: 0.0
  for mirror 2: 0.24
  for mirror 3: 0.47

EXAMPLE 5:

The length of the resonator cavity is equal to around 30 cm and is in the form of an equilateral triangle. Radius of curvature of the concave mirror: 5 m. All three corner mirrors are tilted by +0.5" about the horizontal axis.

Vertical beam misalignment:
  for mirror 1: 35.9
  for mirror 2: 36.36
  for mirror 3: 35.9

This vertical beam misalignment is compensated in the case of the arrangement according to FIGS. 7 and 8, by tilting the mirror 3 about the horizontal axis by −1.5". Following the correction a vertical beam misalignment results.
  for mirror 1: 0.0
  for mirror 2: 0.0
  for mirror 3: 0.36

From these examples as well, it emerges that in the case of the arrangement, according to FIGS. 7 and 8, the pyramidal error can be very largely, but not completely, compensated. Normally there remains a beam misalignment of a few 0.1 μm which cannot be compensated for at least one of the mirrors.

A complete restoration to the original position in the case of the appearance of a pyramidal error, can be achieved with an arrangement such as is shown in FIG. 9. In this case, both mirror 3 and mirror 1 are provided with a servo-drive 15 by which the mirror can be tilted about its axis lying in the plane of the beam. The differential photo-diode 8 again lies behind the mirror 1 while behind mirror 3 there is an additional differential photo-diode 16. The two diodes of the differential photo-diodes 8 and 16 are connected respectively to subtractors 11, 17, of which the output signals are applied respectively to high voltage amplifiers 12, 18, whereby the adjustment signal for the servo-drive 15 is obtained from the high voltage amplifier 18, and the adjustment signal for the servo-drive 19 is obtained from the high voltage amplifier 12. A complete compensation of pyramidal errors is possible by means of the arrangement according to FIG. 9. Even the highest requirements with regard to beam stability can, therefore, be fulfilled. In U.S. Pat. No. 113,387, for example, it is stipulated that the mirrors must have an angular stability of 0.01 sec in order that a gyro drift of 0.01°/h is not exceeded. Such a beam misalignment is so minimal that it can no longer be determined by detection of the change in the output power. The influence of error on the gyro results in this case from the change in the beam path within the plasma flow. From measurement of intensity in this case no more relevant information concerning the gyro error is to be expected. According to the invention, on the other hand, where the beam misalignment is measured directly, the detection of phase angle errors of the specified magnitude is also possible, as is their compensation.

The fundamental difference in the detection of phase angle errors and their compensation between the prior art and the present invention will be explained once more with reference to FIG. 10.

If a pyramidal error is produced in the case of an optimally adjusted ring laser, then the output power measured as beam intensity, is altered. This is represented by the unbroken line in FIG. 10. In the case of the prior methods (U.S. Pat. No. 4,113,387, DE-OS No. 31 43 798), the output power is optimised for stabilisation of the beam. Limits are imposed by this method, in that the gradient of the curve in the range of the optimum is zero and intensity differences can no longer be measured in this range. The same errors occur in the case of a further prior method (GB No. 1 534 998), in which the relative minimum of the existing modulation for a separated light beam is aimed at for beam optimisation.

The broken line in FIG. 10 represents the differential signal which is gained in the way described hereinbefore as a function of the pyramidal error, i.e. by the described measurement of the beam misalignment. In contrast to the beam intensity curve, the curve for the differential signal has the steepest gradient at the point of optimal beam adjustment. In tests with a ring laser with conventional dimensions, the gradient of this curve was measured at 0.4 V/seconds of arc at this point. In the case of an opto-electronics signal to noise ratio of 20 dB, a pyramidal error of 0.01" or a beam misalignment of 0.04 $\mu$m can therefore be established and compensated.

A further advantage of the described arrangement is its high temperature stability. When attaching the two photo-diodes to the rear side of a ring laser corner mirror the position is affected by the thermal movement of this mirror. In the case of a temperature difference of 10° C. between centre and edge of mirror this leads to a photo-diode displacement of $1.25 \times 10^{-2} \mu$m, which can be disregarded.

Further, assuming that the attaching of the differential photo-diodes leads to an additional deterioration in the positioning accuracy by a factor 5, the error caused thereby still remains in the range of the aforementioned resolving power.

The use of two differential photo-diodes aligned in the plane of the beam path and perpendicular thereto, means that both pyramidal errors and phase angle errors can be established and compensated by means of appropriate servo-drives at the mirrors. Particularly suitable in this case is the application of a four quadrant differential photo-diode which can measure beam misalignment in both the specified directions and has the advantage that only one such diode need by adjusted to the optimal beam path. A twin axis tilt drive is provided for at least one of the mirrors in order to achieve horizontal and vertical beam stabilisation. A combined arrangement such as this means that the complete compensation of all beam misalignment errors is possible. If necessary, a servo-diode can be provided in the usual way for the production of a translational movement to stabilize the length of the resonator cavity for at least one of the mirrors.

A servo-drive which is capable of fulfilling the aforementioned requirements is represented in FIGS. 11 to 16. The servo-drive is constructed from preferably circular piezo ceramic disks. The piezoceramic material being provided on both sides with contact surfaces. The contact surface on one side is a continuous contact surface, while on the opposite side the contact surface is divided symmetrically into separate electrically insulated contact segments. The lines of symmetry form the axis of rotation of the servo-drive.

The servo-drive 110 which is shown in FIG. 11 comprises a column of piezoceramic disks 102 which are arranged on a support element 112 in the form of a screw. The disks are mounted on the support element 112 by a nut 114.

The contact surfaces 104, 106 and 108 are each provided with separate electrical connections. The connections 116 of the continuous contact surfaces are connected in parallel and are connected to a common potential $U_3$. The connections 118, which are assigned by way of example to the contact surfaces 106, are connected to a potential $U_4$ and the connections 120, which are assigned to the contact surfaces 108, are connected to a potential $U_5$. The line of symmetry x of the two contact surfaces 106, 108 lies perpendicular to the plane of the paper in FIG. 11.

The piezoceramic disks 102 are polarised in such a way that the direction of expansion and the direction of the electrical field lie in parallel (33-operation). The potential $U_3$ can be a zero potential. Should a positive direct current voltage of similar magnitude then be applied at connections 118 and 120 the column of piezoceramic disks expands if the polarisation in the piezoceramic disks is of similar polarity to the voltage. Should the voltage at 118 and 120 be negative then the column contracts. The servo-drive is responsible for a translational movement, as is shown by the double headed arrow drawn axially in FIG. 11. In order to avoid depolarisation effects, fields in excess of 500 V/mm are to be avoided in the case of most known piezo materials.

Should the voltage $U_4$ and $U_5$ at the connections 118 and 120 be set asymmetrically, then various expansions and/or contractions occur in the area of contact segments 106 and 108. The servo-drive is therefore subject not only to a translational movement but also to a tilting of the head of the screw 112, as indicated by the double headed curved arrow in FIG. 11. As a function of the relationship between the two control voltages $U_4$ and $U_5$, all transitional forms of motion can be set by means of this piezo servo-drive from solely tilting, when $U_4$ and $U_5$ have opposing signs, to solely translational movement, when $U_4$ and $U_5$ are identical in magnitude and sign.

Tilting about at least two axes can be achieved with the embodiment of the piezoceramic disks according to FIG. 13. In the case of the disk 122 represented here, one side is provided with a continuous contact surface as in the case of the embodiment according to FIG. 12. On the opposite side of the disk four contact segments 124, 126, 128, and 130 are provided lying symmetrically to the axes of symmetry x and y which are perpendicular to one another. Each of these four contact segments is provided with an electrical connection. The four contact segments can therefore, be connected alternatively to two voltage potentials. By electrical interconnection of the contact segments 124 and 126 on the one side and 128 and 130 on the other side, tilting can be effected about the y-axis and by electrical interconnection of the contact segments 124 and 128 on the one side and 126 and 130 on the other side, tilting can be effected about the x-axis. In this way tilting can be effected about two axes displaced by 90°. It is also possible to connect two respectively diametrically opposite contact segments i.e. 124 and 130 or 126 and 128 to different voltage potentials. In this way tilting can be achieved about axes of tilting shifted by 45° in relation to the x and y axes. By connecting all four contact segments 124, 126, 128 and 130 to the same voltage potential a translational movement is produced.

A modified embodiment of a servo-drive is represented in FIG. 14. Here again, a column of piezoceramic disks is arranged on a support 132 in the form of a screw, the piezoceramic disks being pressed together by a nut 134. The disks between the broken lines I and II are here designed according to FIG. 12 or FIG. 13. These disks produce the tilting motion.

Piezoceramic disks which are fully contacted on either side are arranged between the broken lines II and III. These disks effect a length alteration. All continuous contact surfaces on one side of the piezoceramic disks in both sets are connected to a connection 110 to which a potential $U_3$ is applied. The opposite contact surfaces of the piezoceramic disks in the region II-III are connected to a connection 111 to which a potential $U_3$ is applied. The contact surfaces 106 and 108 of the piezoceramic disks in the region I-II are connected respectively to a connection 140 or 142 at the potentials $U_4$ and $U_5$. In addition, it is of course possible also to provide switching devices to connect both connections 140 and 142 to the connection 138, and therefore to the potential $U_9$ and therefore to use the whole column of piezoceramic disks for effecting a length alteration if, in the case of a reduced tilting requirement, substantial length alterations are to be effected with the shortest possible overall length of the servo-drive.

FIG. 15 illustrates a corner mirror 148 of a ring laser type of gyro having an adjusting element 168 designed in the way described hereinbefore. In this case the block 144 is provided with a ground contact surface 156 on which lies the mirror 148. The mirror 148 comprises the mirror holder 158 which is arranged in a membrane 160 which is designed in one piece and has an outer frame 162 which rests against the surface 156. In a cover disk 164 there is a holder 166 for an adjusting element 168 which engages at one end in an opening 170 on the back of the mirror holder. The adjusting element is held in contact under initial compression against the back of the mirror holder 158 by means of a distance washer 172. Given appropriate initial compression, the tilting and translational movements of the adjusting element are transferred very precisely to the mirror holder. Because of the relatively high driving torque which can be applied via the adjusting element the mirror membrane 160 can be designed to be relatively rigid. The mirror can, therefore, be designed in such a way as to be sensitive to translational and rotational acceleration. This represents a considerable advantage in the case of a laser type of gyro which must be dithered around its vertical axis to overcome the problem of lock-in torsional vibrations.

With the described servo-drive it is possible to provide a relatively large stroke for keeping the beam path constant. Moreover, tilting of the corner mirrors about their horizontal axes lying in the plane of the beam or extending perpendicular thereto is effected with a high level of precision. In general, tilt angles of between 1" and 2" are sufficient for the compensation of thermal of mechanical distortions of block 44. This requirement is fulfilled with distinction by the described adjusting elements.

In principle, the use of a single photo-diode is also possible, this being arranged in such a way that it is struck in a different way by the beam in the case of a beam displacement and so gives an output signal as a function of the position of the beam, from which the adjustment signal is derived for the servo-drive by which the relevant mirror is to be tilted.

What we claim as our invention and desire to secure by Letters Patent of the United States is:

1. A ring laser, especially for a ring laser type gyro, comprising a block made of a thermally and mechanically highly-stable ceramic glass; three corner mirrors, one of which is mounted for tilting about an axis and one of which comprises a semi-transparent separating mirror; a servo-drive for tilting said tiltable mirror about said axis; a differential photo detector positioned behind said tiltable mirror in the beam path of the separated beam portion of one of the rotating wave trains of said ring laser, said differential photo detector comprising at least one differential photo diode, said differential photo diode producing an output signal and being constructed and oriented so that said output signal is a function of the relative position of said separated beam portion of said one of said rotating wave trains thereon; and a control responsive to said output signal for tilting said tiltable mirror with said servo-drive to position said separated beam portion of said one of said rotating wave trains in a predetermined stabilized position on said photo detector.

2. A ring laser according to claim 1, in which said at least one tiltable corner mirror is tiltable about a vertical axis perpendicular to the plane of the beam path.

3. A ring laser according to claim 1, in which said at least one tiltable corner mirror is tiltable about a horizontal axis lying in the plane of the beam path.

4. A ring laser according to claim 1, in which said at least one tiltable corner mirror can undergo parallel displacement.

5. A ring laser according to claim 1, in which said servo-drive for said tiltable mirror comprises a plurality of piezo disks arranged in a column, said disks being polarised in such a way that the direction of extension of said column and the direction of the electrical field are parallel, at least one of the said piezo disks having a contact surface thereon, divided symmetrically into a plurality electrically separate contact segments and said servo-drive also including a plurality of separate electrical connections, each provided on a respective one of said contact segments of said contact surface on said at least one piezo disk.

6. A ring laser according to claim 5, in which said contact surface on said at least one piezo disk has four symmetrical contact segments.

7. A ring laser according to claim 5, in which said column of piezo disks also includes a support at one end of said column and a back surface of said tiltable mirror, said piezo disks in said column being supported initially in compression between said support and said mirror and also in such a way that said contact segments are symmetrical about the axis of tilt of said mirror.

8. A ring laser, especially for a ring laser type gyro, comprising a block made of a thermally and mechanically highly-stable ceramic glass; three corner mirrors, one of which is mounted for tilting about an axis and one of which comprises a semi-transparent separating mirror; a servo-drive for tilting said tiltable mirror about said axis; a differential photo detector positioned behind said tiltable mirror in the beam path of the separated beam portion of one of the rotating wave trains of said ring laser, said differential photo detector comprising two photo diodes positioned adjacent one another in the plane of said one of said rotating wave trains, each of said photo diodes producing an output signal and being constructed and oriented so that the output signal therefrom is a function of the relative position of said separated beam portion of said one of said rotating wave trains thereon, and a control comprising a subtractor for determining the difference between the output signals from said two photo diodes, said control being responsive to said difference for tilting said tiltable mirror with said servo-drive to position said separated beam portion of said one of said rotating waves in a predetermined stabilized position on said photo detector.

9. A ring laser according to claim 8, in which said two photo-diodes are incorporated in a differential photo-diode, the centre point of which lies in the beam path of the separated beam portion in the case of optimised beam rotation in the ring laser.

10. A ring laser according to claim 9, in which said differential photo-diode is a four quadrant differential photo-diode.